United States Patent [19]

Irwin

[11] 4,319,789
[45] Mar. 16, 1982

[54] ROLLER BEARING AND ANTI-SKEWING SYSTEM THEREFOR

[75] Inventor: Arthur S. Irwin, Bemus Point, N.Y.

[73] Assignee: TRW Inc., Cleveland, Ohio

[21] Appl. No.: 130,494

[22] Filed: Mar. 13, 1980

[51] Int. Cl.$^3$ .................... F16C 13/00; F16C 33/00; F16C 35/00

[52] U.S. Cl. .................... 308/207 R; 308/207 A; 308/216; 308/217

[58] Field of Search ............... 308/217, 207 R, 207 A, 308/216

[56] References Cited

U.S. PATENT DOCUMENTS

| | | | |
|---|---|---|---|
| 3,074,255 | 1/1963 | Reinecke | 308/207 R X |
| 3,166,363 | 1/1965 | Kay | 308/207 R |
| 3,304,139 | 2/1967 | Toth et al. | 308/207 R |
| 3,382,016 | 5/1968 | Schmidt | 308/207 R |
| 3,501,209 | 3/1970 | Ende | 308/207 R |
| 3,647,273 | 3/1972 | Pfaffenberger | 308/217 |
| 4,154,491 | 5/1979 | Darner | 308/217 |
| 4,167,297 | 9/1979 | Cheesman | 308/207 R X |

Primary Examiner—Henry K. Artis

Attorney, Agent, or Firm—Daniel G. Blackhurst

[57] ABSTRACT

A structural arrangement to restrain skewing of the individual cylindrical rollers which comprise a roller type bearing. At least one of the inner and outer bearing race defining means includes a pair of laterally spaced apart side flanges to partially capture the rollers therebetween with the opposed roller ends each associated with one of the side flanges. At least one of the side flanges is defined by a separate flange member which is selectively movable toward and away from the other side flange. This flange member is urged into engagement with the roller ends associated therewith and causes the rollers to be axially moved so that the roller other ends engage the other side flange. This relationship effects close maintenance of the rollers between the side flanges to prevent roller skewing during bearing use. The means for urging the flange member may advantageously comprise resilient or spring type biasing means as well as fluid pressure. During bearing use, a hydrodynamic lubricant film provides axial pressure to slightly deflect the biasing means and thus accommodate slight separation between the side flanges and roller ends to preclude wear therebetween.

8 Claims, 5 Drawing Figures

ROLLER BEARING AND ANTI-SKEWING SYSTEM THEREFOR

BACKGROUND OF THE INVENTION

This invention pertains to the art of bearings and more particularly to cylindrical roller type bearings.

The invention is particularly applicable to means for guiding the rollers or restraining roller skewing in such bearings and will be described with particular reference thereto. However, it will be appreciated that the invention may be adapted to use in other applications and environments.

Heretofore, during some applications for high speed cylindrical roller bearings, the individual rollers have demonstrated an alarming tendency to skew. That is, the rollers become slightly misaligned or skewed from a desired position wherein the centerlines of the rollers do not remain parallel to the centerline of the controlling race. That is, one end of the roller moves ahead or behind the other end, as the roller travels in its orbital path.

In some bearing designs, such skew motion is limited by providing for a contacting relationship between the opposed relatively flat ends of the rollers and the pair of spaced apart rigid flanges or side walls associated with the bearing race defining means. To prevent binding between these side flanges and the rollers during bearing use, some axial roller clearance is provided. That is, the lateral distance between the side flanges is slightly greater than the length of the rollers. Although this axial clearance is held to a minimum, thermal design considerations and manufacturing tolerances can cause the maximum value of this clearance to be or become appreciable. As a result, any of the rollers having skewing tendencies will be permitted to turn considerably prior to the time the roller opposite corners contact the side flanges. Roller skewing is not conducive to obtaining an optimum roller bearing relationship between the inner and outer bearing race defining means. Wear has been demonstrated to occur on the roller ends and race side flanges, induced by skewing.

Accordingly, it has been considered desirable to develop an anti-skewing system for roller bearing rollers and/or a roller bearing construction which includes an anti-skewing system. The subject invention is considered to meet these needs and provide an arrangement which is simple in design, economical to manufacture and utilize, versatile for accommodating use in different types of roller bearing designs and readily adapted to use in many varied applications and/or environments.

BRIEF DESCRIPTION OF THE INVENTION

The present invention provides a new roller bearing and roller anti-skewing system which facilitates maintenance of proper roller alignment relative to those means employed to define the bearing races. The invention contemplates the provision of at least one bearing race side flange or wall which is laterally movable toward and away from an associated side flange or wall with the rollers extending axially therebetween. The two side flanges cooperate with the opposed ends of each roller in order to maintain precise roller orientation relative to the bearing races. The movable side flange is biased under some predetermined force toward the other side flange to effect an alignment retaining relationship for the rollers between the side flanges.

More particularly, and in accordance with the present invention, an anti-skewing system is provided for a roller type bearing of the type having a plurality of cylindrical rollers disposed in a parallel generally side-by-side relationship with each other and operably interposed between laterally spaced apart inner and outer bearing race defining means so as to extend generally transversely thereof. At least one of the race defining means includes a pair of side flanges extending from the one race toward the other. These side flanges are laterally spaced apart from each other for receiving the cylindrical rollers therebetween so that the opposed roller ends are each closely associated with one of the side flanges. At least one of the side flanges is, in turn, defined by a separate flange member movable toward and away from the other side flange. Means are included for continuously urging the flange member toward the other side flange at least when the bearing is operational. This urging means causes the flange member to be moved into engagement with the ends of the rollers associated therewith and urges the rollers in an axial direction to move the other ends thereof toward engagement with the other side flange. In this manner, the rollers are advantageously prevented from skewing during bearing operation or use.

According to another aspect of the invention, the flange member includes a wall disposed in sliding engagement with the one race defining means and one end wall facing the associated roller ends for defining a side flange area. The urging means operably communicates with an area of the flange member generally opposed to the flange member one end wall.

In accordance with another aspect of the invention, the urging means may comprise alternative means for providing a predetermined biasing force against the flange member. In one structural arrangement, for example, spring biasing means such as a diaphragm type spring or Belleville washer is advantageously employed. In another structural arrangement, a plurality of compression springs are employed at spaced part intervals from each other in biasing engagement with the flange member. Still another arrangement of the invention utilizes fluid pressure means to obtain the necessary biasing force.

According to still another aspect of the invention, an overall roller bearing assembly is provided which advantageously includes an anti-skewing system as a part thereof.

The principal object of the present invention is the provision of a new roller bearing and roller anti-skewing system.

Another object of the invention is the provision of such a bearing and system which are simple in design and easy to implement to practical application.

A further object of the invention is the provision of a roller bearing and roller anti-skewing system which are versatile and which may be readily adapted to use for a wide variety of applications and environments.

Still other objects and advantages of the present invention will become apparent to those skilled in the art upon a reading and understanding of the following specification.

BRIEF DESCRIPTION OF THE DRAWINGS

The invention may take physical form in certain parts and arrangements of parts, preferred and alternative embodiments of which will be described in detail in this specification and illustrated in the accompanying drawings which form a part hereof and wherein.

DETAILED DESCRIPTION OF THE PREFERRED AND ALTERNATIVE EMBODIMENTS

Figures 1, 3:
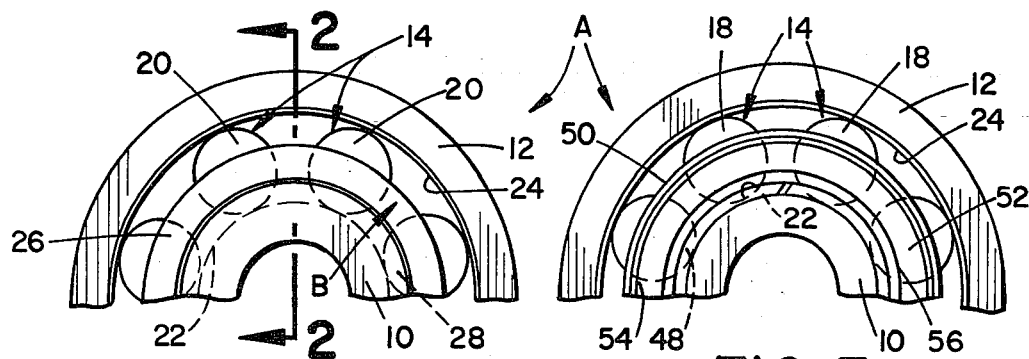
FIG. 1 is a partial somewhat schematic end view of a typical roller type bearing which incorporates the concepts of the subject invention.
FIG. 3 is an end view of the roller type bearing of FIG. 1 taken in the opposite direction therefrom.
Figure 2:
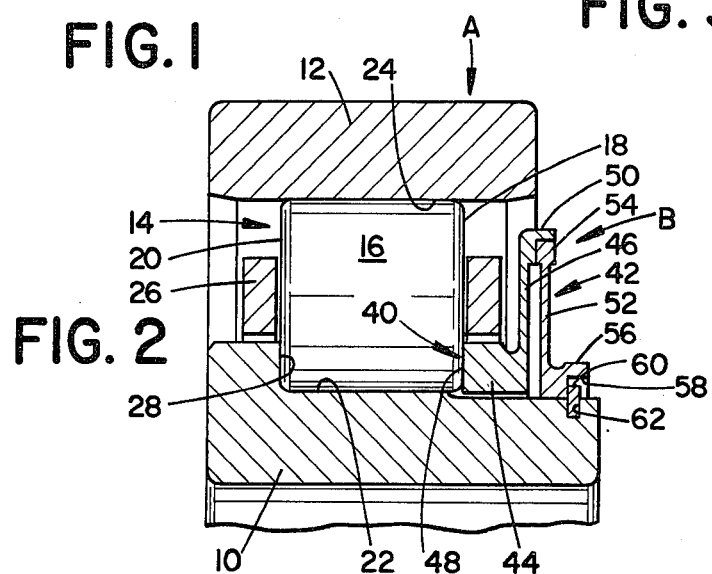
FIG. 2 is a cross-sectional view taken along lines 2—2 of FIG. 1 showing the details for one embodiment of the invention.

Referring now to the drawings wherein the showings are for purposes of illustrating preferred and alternative embodiments of the invention only and not for purposes of limiting same, FIGS. 1–3 show a roller type bearing A which has an anti-skewing system B incorporated thereinto.

More particularly, FIGS. 1–3 show roller bearing A as having a cylindrical first or inner race 10, a cylindrical second or outer race 12 and a plurality of cylindrical rollers 14 operably interposed between the inner and outer races. Each roller includes an outer peripheral surface 16 and opposed ends 18,20. Roller peripheral surfaces 16 operably engage opposed peripheral surfaces 22,24 of inner and outer races 10,12 in a generally rolling type of relationship therewith. A roller cage generally designated 26 is generally centrally interposed between peripheral race surfaces 22,24 in an operative relationship with rollers 14. This cage functions to maintain the rollers in a desired special relationship relative to each other as is well known in the art. The cage itself is only schematically shown since any number of types and/or styles thereof could be satisfactorily employed.

A pair of side flanges or walls extend upwardly from the surface 22 of inner race 10 toward surface 24 of outer race 12. As best seen in FIG. 2, one of these side flanges comprises a rigid structure integral with inner race 10 generally designated 28 and the other side flange is defined by a portion of anti-skewing system B. The two flanges extend circumferentially of inner race peripheral surface 22 and are laterally spaced apart from each other by an amount sufficient to accommodate receipt of rollers 14 in an axially extending relationship therebetween. When properly located, roller end faces 18 are closely associated with the side flange defined by anti-skewing system B and roller end faces 20 are closely associated with rigid side flange 28. As a result, the longitudinal axes of rollers 14 will extend substantially transverse of race peripheral surfaces 22,24.

While one preferred roller type bearing construction has been generally shown in FIGS. 1–3, the subject invention is readily adapted to use in many other types or designs of such bearings. Any modifications thus involved are not deemed to in any way depart from the overall intent or scope of the invention. For example, it would be possible to replace rigid side flange 28 with a second anti-skewing system B in a manner such that the two systems would act oppositely from each other. Also, side flanges could be included on outer race 10 instead of the inner race or both races could include side flanges. The particular modifications which could be involved will, to some extent, be determined by the specific application contemplated for the bearing. In addition, and while separate inner and outer races have been shown, it would be possible to practice the concepts of the subject invention where, for example, the inner race is defined by some structural component such as a shaft or the like and/or the outer race is defined by some other structural component.

With particular reference to FIGS. 2 and 3, anti-skewing system B for the particular bearing construction involved is generally comprised of a separate annular flange member 40 and an urging or biasing means 42. In this embodiment, the flange member has a generally L-shaped cross-section defined by a bottom leg 44 and a side leg 46. The terminal end face 48 of the bottom leg 44 defines the side flange or wall of the system which cooperates with roller end walls 18 in a manner to be described. The height of or thickness of leg 44 and end face 48 thereof is such that there will be no binding interference with roller cage 26. The inside diameter of annular flange member 40 is dimensioned so that the bottom or inner surface of bottom leg 44 is closely received over inner race 10 in at least a lateral sliding relationship with peripheral surface 22 thereof, as extended, reduced in diameter. Side leg 46 extends toward outer race 12 and includes an axially outward extending flange area 50 disposed at the outer terminal end thereof to act as a retaining means for urging or biasing means 42.

In the embodiment here under discussion, urging or biasing means 42 comprises a mechanical spring of the diaphragm or Belleville type. As shown, the spring includes an annular body 52 having a somewhat enlarged or bulbuous radial outer end 54 dimensioned to be closely received in and retained by flange 50 of flange member side leg 46. The radial inner end of spring body 52 includes an enlarged mounting area 56 extending generally axially outwardly therefrom. The inner diameter of mounting area 56 facilitates receipt of the spring on inner race 10 circumferentially around peripheral surface 22 thereof, as extended, reduced in diameter. A circumferentially extending groove or stepped area 58 at the inner periphery of protrusion 56 accommodates the outer portion of a snap ring 60. The snap ring itself is located in a circumferential groove 62 disposed in inner race peripheral surface 22.

The dimensional and cooperative relationships between flange member 40 and biasing means 42 when mounted on the bearing in the manner best shown in FIG. 2 are such that the flange member is continuously biased axially of the inner race into engagement with ends 18 of rollers 14. That is, spring body 52 is configured so that a continuous inward biasing force is exerted by bulbuous area 54 against flange member side leg 46 so that the side flange or wall defined by end face 48 of flange member bottom leg 44 is continuously urged toward engagement with roller ends 18. This, in turn, causes the rollers to be axially moved of themselves in a direction laterally of the inner and outer races until roller ends 20 engage rigid side flanges 28. The relationship thus achieved under the influence of spring or biasing pressure maintains a close spaced relationship between the roller ends and the side flanges to prevent any potential for undesired roller skewing during bearing operation or use. Snap ring 60 provides a positive home position for the anti-skewing system and prevents axial movement thereof outwardly from the inner race.

The amount of biasing force provided by biasing means 42 is designed to be of a value so that the amount or degree of clamping obtained for the rollers between rigid side flange 28 and bottom leg end face 48 will not cause component scoring as a result of sliding contact therebetween during bearing use or operation. Moreover, the normal lubrication utilized for roller type bearing A will provide a hydrodynamic film between roller ends 18, 20 and the inner race side flanges at least during bearing operation. This film exerts axial pressure between the side flanges and associated roller ends to slightly deflect the spring outwardly and thereby provide separation between the side flanges and roller ends. The thickness variability of this oil film, from roller to roller with reference to planar surface 48, compensates for the relatively small variation in length standard in roller sets incorporated in high-grade roller bearings.

While the structural embodiment of the invention best shown in FIGS. 2 and 3 utilizes a Belleville or diaphragm type of spring, many other types of biasing means may also be advantageously employed including, for example, coil springs, wave washers, elastomeric materials and combinations thereof. One such alternative arrangement is specifically shown in FIG. 4 and utilizes a plurality of compression springs. For ease of illustrating this alternative, like components are identified by like numerals with a primed (') suffix and new components are identified by new numerals. Also, the outer bearing race has been deleted from this view for the sake of convenience.

Figures 4, 5:
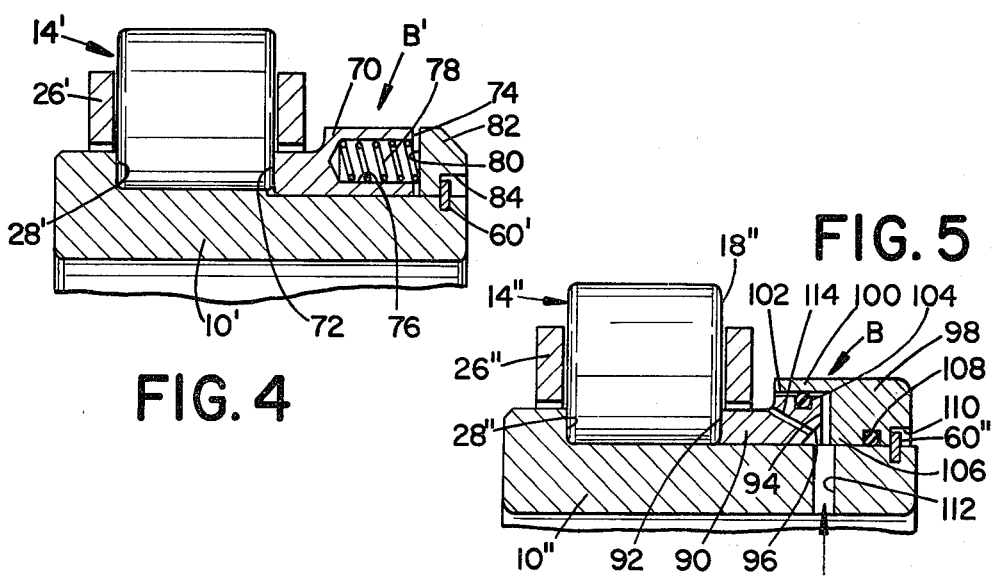
FIG. 4 is a cross-sectional view similar to FIG. 2 with the outer bearing race deleted for ease of illustrating an alternative structure which utilizes the concepts of the invention; and, FIG. 5 is a cross-sectional view similar to FIG. 4 showing still another alternative construction for the invention.

In FIG. 4, an annular flange member generally designated 70 is closely slidably received over inner race 10' and includes generally opposed inner and outer end faces 72, 74. The inner end face defines a side flange for cooperation with rigid side flange 28' in preventing roller skewing. Outer end face 74 includes a plurality of axially inwardly extending cavities with one such cavity being shown and designated by numeral 76 in FIG. 4. It will be appreciated that these cavities are located at spaced apart intervals circumferentially around outer face 74. A compression spring such as the one designated 78 in FIG. 4 is received in each cavity 76 with the outermost ends thereof acting against the end face 80 of an annular retaining block or ring 82 which is also received over inner race 10'. Retaining block 80 includes a stepped area 84 which receives snap ring 60' to define an anti-skewing system home position. The FIG. 4 embodiment operates and functions in substantially the same manner as previously described with reference to the embodiment of FIGS. 1-3.

Still another alternative construction for the subject invention is shown in FIG. 5. This arrangement operates in generally the same manner as previously described and utilizes fluid pressure for biasing the flange member into engagement with the rollers. Here too, like components are identified by like numerals but with the inclusion of a double primed (") suffix and new components are identified by new numerals. The bearing outer race has also been eliminated for ease of illustration.

In FIG. 5, an annular flange member 90 is closely slidably received on inner race 10" and includes generally opposed inner and outer end faces 92, 94. The inner end face defines a side flange for cooperation with side flange 28" and the outer end face is beveled as at 96. An annular retaining block 98 is also closely received over the inner race and includes an extension or flange 100 dimensioned and configured to extend axially forward over top surface 102 of flange member 90. An O-ring type seal 104 is conveniently interposed between this extension and the flange member top surface. Retaining block 98 is beveled as at area 106 and includes an O-ring type seal 108 interposed between the bottom or inner surface thereof and the associated peripheral surface 22" of inner race 10". Retaining block 98 also includes a stepped area 110 to cooperate with snap ring 60".

At least one fluid supply port 112 communicates between the laterally spaced apart peripheral surfaces of inner race 10" and is located so as to generally communicate between beveled areas 96, 106 of flange member 90 and retaining block 98 at inner race surface 22". Fluid such as oil, hydraulic fluid or the like is introduced under pressure from a source (not shown) into and through port 112 so as to act against outer end face 94 of the flange member. This action urges the flange member axially of the inner race until inner end face 92 thereof engages associated end faces 18" of rollers 14". At least one relief port generally designated 114 extends through the flange member in fluid communication with flange member beveled area 96 to accommodate fluid pressure relief. Such relief will be sized to permit an appropriate urging or biasing force to be maintained against the flange member.

It will be appreciated that any number of structural modifications may be made to the three separate embodiments disclosed herein without in any way departing from the overall intent or scope of the invention. These three embodiments do, however, demonstrate the versatility of application for the invention in preventing roller skewing in roller type bearings. The basic inventive concept disclosed may be readily adapted to use in many different bearing designs and constructions for many different and varied applications. For example, the flexibly mounted sidewall may be supported and/or caused to move toward the opposing flange by means of any flexible material, such as an elastomer.

The invention has been described with reference to preferred and alternative embodiments. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. An anti-skewing system for a roller type bearing having a plurality of generally parallel disposed rollers operably interposed between laterally spaced apart means defining first and second bearing races, at least one of said race defining means including a pair of side flanges extending therefrom toward the other of said race defining means with said side flanges being laterally spaced apart from each other to permit said rollers to axially extend therebetween so that opposed ends of said rollers are spaced closely adjacent said side flanges, said system comprising:

a separate flange member defining at least one of said side flanges with said flange member being movable toward and away from the other of said side flanges, said flange member including a wall disposed in sliding engagement with said one race and one wall facing said roller one ends for defining said one side flange; and, urging means operably communicating with an area of said flange member generally opposed to said one wall for urging said flange member toward said other side flange at least when said bearing is operational, said urging means causing said flange member one wall to be moved into engagement with the one end of the rollers which are associated therewith to urge the rollers in an axial direction so that the other ends of the rollers will be moved toward engagement with said other side flange, whereby the relationship thus achieved prevents roller skewing during bearing operation.

2. The system as defined in claim 1 wherein the urging force provided by said urging means has some predetermined value adapted to be overcome by a hydrodynamic fluid film developed between said side flanges and roller opposed ends at least during bearing operation whereby said opposed ends become slightly axially spaced from said side flanges to prevent wear therebetween.

3. The system as defined in claim 1 wherein said urging means comprises mechanical spring means.

4. The system as defined in claim 3 wherein said spring means comprises a diaphragm type spring and said flange member has a generally L-shaped configuration in transverse cross-section, the bottom leg of said L-shaped configuration being in sliding engagement with said one race and the terminal end of said bottom leg comprising said one wall, said spring having one end acting on the side leg of said L-shaped configuration adjacent the terminal end thereof with said system further including means for restraining the other end of said spring against movement transversely away from said flange member.

5. A roller type bearing including means for detering skewing of individual rollers during bearing operation, said bearing comprising:

first means for defining a generally cylindrical inner bearing race; second means for defining a generally cylindrical outer bearing race, said first and second race defining means being substantially coaxial and defining an annular roller receiving cavity therebetween; a plurality of cylindrical rollers operably interposed relative to said first and second race defining means in said annular roller receiving cavity so that said rollers each extend generally axially thereof and wherein said rollers each have opposed ends; a pair of laterally spaced apart side flanges extending from one of said first and second race defining means toward the other generally circumferentially of said one race defining means, said cylindrical rollers extending between said pair of flanges with each of the opposed ends of each roller being closely spaced toward an associated one of said side flanges; a separate annular flange member defining at least one of said side flanges and being movable toward and away from the other of said side flanges, said flange member including a surface thereof disposed in a sliding relationship with said one race defining means and one surface facing the associated roller ends adapted for engagement therewith; and, means for urging said flange member toward said other side flange at least when said bearing is operational, said urging means causing said flange member one surface to be moved into engagement with the ends of said rollers associated therewith and urge said rollers in an axial direction to move the roller other ends toward engagement with said other side flange, whereby the rollers are restrained from skewing movement during relative rotation between said first and second race defining means.

6. The roller bearing as defined in claim 5 wherein said roller bearing further includes means for restraining movement of said flange member laterally away from said other side flange against the force of said urging means to some predetermined amount.

7. The roller bearing as defined in claim 6 wherein said urging force has some predetermined value adapted to be overcome by a hydrodynamic fluid film developed between said side flanges and roller opposed end at least during bearing operation whereby said opposed ends become slightly axially spaced from said side flanges to prevent wear therebetween.

8. The roller bearing as defined in claim 5 wherein said urging means comprises spring biasing means disposed in biasing communication with said flange member and said flange member includes means for retaining said biasing means properly positioned relative thereto.

* * * * *